US008865111B2

(12) United States Patent
Nishikawa et al.

(10) Patent No.: US 8,865,111 B2
(45) Date of Patent: *Oct. 21, 2014

(54) FILMY GRAPHITE AND PROCESS FOR PRODUCING THE SAME

(71) Applicant: Kaneka Corporation, Osaka (JP)

(72) Inventors: Yasushi Nishikawa, Takatsuki (JP); Mutsuaki Murakami, Settsu (JP); Kiyokazu Akahori, Otsu (JP)

(73) Assignee: Kaneka Corporation, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,813

(22) Filed: Oct. 29, 2013

(65) Prior Publication Data
US 2014/0056801 A1    Feb. 27, 2014

Related U.S. Application Data

(60) Continuation of application No. 13/707,047, filed on Dec. 6, 2012, now Pat. No. 8,597,606, which is a continuation of application No. 13/275,120, filed on Oct. 17, 2011, now Pat. No. 8,337,800, which is a continuation of application No. 12/829,524, filed on Jul. 2, 2010, now Pat. No. 8,066,966, which is a division of application No. 10/570,074, filed as application No. PCT/JP03/11221 on Sep. 2, 2003, now Pat. No. 7,758,842.

(51) Int. Cl.
C01B 31/04    (2006.01)

(52) U.S. Cl.
CPC ..................... C01B 31/04 (2013.01)
USPC .......................... 423/448; 528/373

(58) Field of Classification Search
CPC ....................................... C01B 31/04
USPC .................. 528/170, 373; 423/448
See application file for complete search history.

(56) References Cited

U.S. PATENT DOCUMENTS

| 3,928,544 | A |   | 12/1975 | Yokota et al. |
| 5,043,185 | A |   | 8/1991  | Murakami et al. |
| 5,070,181 | A |   | 12/1991 | Kawai et al. |
| 5,091,025 | A | * | 2/1992  | Murakami et al. ......... 156/89.25 |
| 5,352,524 | A |   | 10/1994 | Nagata |
| 5,443,859 | A |   | 8/1995  | Nagata |
| 5,460,890 | A |   | 10/1995 | Okahashi et al. |
| 5,480,964 | A |   | 1/1996  | Harris et al. |
| 6,131,651 | A |   | 10/2000 | Richey, III |

(Continued)

FOREIGN PATENT DOCUMENTS

| JP | 63-197628 A | 8/1988 |
| JP | 04-149012 A | 5/1992 |

(Continued)

OTHER PUBLICATIONS

English machine translation of JP 07109171 A.*

(Continued)

Primary Examiner — Richard M Rump
(74) Attorney, Agent, or Firm — Marshall, Gerstein & Borun LLP

(57) ABSTRACT

A process for producing a filmy graphite includes the steps of forming a polyimide film having a birefringence of 0.12 or more and heat-treating the polyimide film at 2,400° C. or higher.

20 Claims, 9 Drawing Sheets

200nm

(56) References Cited

U.S. PATENT DOCUMENTS

| | | |
|---|---|---|
| 6,335,416 B1 | 1/2002 | Nojiri et al. |
| 6,350,844 B1 | 2/2002 | Ono et al. |
| 2002/0021997 A1 | 2/2002 | Taomoto et al. |
| 2002/0188090 A1 | 12/2002 | Yamashita et al. |
| 2004/0063900 A1 | 4/2004 | Kaneshiro et al. |
| 2004/0151928 A1 | 8/2004 | Kaneshiro et al. |

FOREIGN PATENT DOCUMENTS

| | | | |
|---|---|---|---|
| JP | 04-149014 | A | 5/1992 |
| JP | 04-310569 | A | 11/1992 |
| JP | 05-132360 | A | 5/1993 |
| JP | 05-237928 | A | 9/1993 |
| JP | 07-109171 | A | 4/1995 |
| JP | 07-503813 | T | 4/1995 |
| JP | 07109171 | A * | 4/1995 |
| JP | 2000-044220 | A | 2/2000 |
| JP | 2000-063543 | A | 2/2000 |
| JP | 2001-072781 | A | 3/2001 |
| JP | 2003-073473 | A | 3/2003 |
| JP | 2003/165850 | A | 6/2003 |
| WO | WO-93/16579 | A1 | 8/1993 |

OTHER PUBLICATIONS

ASTM D696-91, Standard Test Method for Coefficient of Linear Thermal Expansion of Plastics Between -30° C. and 30° C., 2003.
Carbon Society of Japan (editor), Introduction to New Carbon Materials, Realize Co. Ldt., 1998, p. 119.
Catalogue of Kapton, p. 7, 1988.
Hishiyama, Yoshihiro, et al., "Correlation between Residual Resistivity RatiopRT/p4.2K and Transversal Magnetoresistance in Highly Oriented Graphite," TANSO, Apr. 1988, No. 13, p. 94-99.
Hoshi, Toshiharu et al., "Super Graphite," National Technical Report, vol. 40, No. 1, Feb. 1994, pp. 74-80.
International Search Report in PCT/JP03/11221 dated Nov. 27, 2003.
Ishikawa, Toshikatsu, et al., New Carbon Industry, Kindai Hensyusya Co. Ltd., Jul. 1, 1986, p. 91-100.
Kaburagi, Yutaka et al., "Assessment for Crystal Perfection from Microstructure and Electronic Property of Highly Oriented Graphite", Surface, 1999, May, Vol. 37, No. 5 , p. 309-327.
Murakami, M. et al., "High-Quality and Highly Oriented Graphite Block from Polycondensation Polymer Films," Carbon, vol. 30, No. 2, 1992, pp. 255-262.
Murakami, M. et al., "New Graphite Radiation Optical Element" Hosako, Japan, Aug. 1993, vol. 6, No. 3, pp. 331-338.
Plastic Jiten, Kabusiki Kaisha Asakura Shoten, Mar. 1, 1992, p. 620, Table 3.8.5.
Taomoto, Akira, "Flexible Super Graphite Sheet Having a Superior Thermal Conductivity" Function & Materials, Japan, Oct. 1999, vol. 19, No. 11, pp. 27-33.
Taomoto, Akira, "Super Graphite," Industrial Materials, Mar. 1999, vol. 47, No. 3 pp. 69-72.
Takeichi, et al. Carbonization and Graphitization of Polyimide Films: Polyamide Acid Methyl Ester of PMDA/PDA as a Precursor. *Journal of Applied Polymer Science*, 1996, vol. 61, pp. 1571-1578.
Yang. Measurements of Equi-Biaxial Stress in Adhered Polyimide Films by Tilted Beam Polarized Light Microscopy. *Thin Solid Films*, 1994, vol. 252, pp. 131-134.
Supplementary European Search Report dated Feb. 3, 2012 in pending counterpart European application No. EP 03818561.

* cited by examiner

———— 200nm

———— 10nm

———— 200nm

10nm

———— 200nm

—— 10nm

———— 200nm

———— 10nm

FILMY GRAPHITE AND PROCESS FOR PRODUCING THE SAME

CROSS-REFERENCE TO RELATED APPLICATIONS

This is a continuation application U.S. patent application Ser. No. 13/707,047, filed Dec. 6, 2012, now U.S. Pat. No. 8,597,606, which is a continuation application of U.S. patent application Ser. No. 13/275,120, filed Oct. 17, 2011, now U.S. Pat. No. 8,337,800, which is a continuation application of U.S. patent application Ser. No. 12/829,524, filed Jul. 2, 2010, now U.S. Pat. No. 8,066,966, which is a divisional application of U.S. patent application Ser. No. 10/570,074, filed Mar. 1, 2006, now U.S. Pat. No. 7,758,842, which claims the benefit of International Patent Application No. PCT/JP2003/011221, filed Sep. 2, 2003.

TECHNICAL FIELD

The present invention relates to a filmy graphite used as a heat-dissipating film, a heat-resistant seal, a gasket, a heating element, or the like, and a process for producing the same.

BACKGROUND ART

Filmy graphites are important as industrial materials because of their excellent heat resistance, chemical resistance, high thermal conductivity, and high electrical conductivity, and are widely used as heat-dissipating materials, heat-resistant sealing materials, gaskets, heating elements, etc.

As a representative example of a process for producing an artificial filmy graphite, a process referred to as an "expanded graphite production process" is known. In this process, natural graphite is dipped in a mixed solution of concentrated sulfuric acid and concentrated nitric acid, followed by rapid heating to produce an artificial graphite. The resulting artificial graphite is washed to remove the acids and then formed into a film with a high-pressure press. However, in the filmy graphite thus produced, strength is low and other physical properties are insufficient. Moreover, the residual acids also give rise to a problem.

In order to overcome these problems, a process has been developed in which a special polymer film is graphitized by direct heat treatment (hereinafter, referred to as a "polymer graphitization process"). Examples of the polymer film used for this purpose include films containing polyoxadiazole, polyimide, polyphenylenevinylene, polybenzimidazole, polybenzoxazole, polythiazole, or polyamide. The polymer graphitization process is a process which is far simpler than the conventional expanded graphite production process, in which mixture of impurities, such as acids, does not essentially occur, and which is capable of achieving excellent thermal conductivity and electrical conductivity close to those of single crystal graphite (refer to Japanese Unexamined Patent Application Publication Nos. 60-181129, 7-189171, and 61-275116).

However, the polymer graphitization process has two problems. First, it is difficult to obtain a thick filmy graphite compared with the expanded graphite production process. Although various attempts have been made to improve such a problem, as it now stands, transformation into a quality graphite is possible only when the thickness of the starting material film is up to about 50 μm.

Secondly, the graphitization requires long-time heat treatment at extremely high temperatures. In general, transformation into a quality graphite requires heat treatment in a temperature range of 2,800° C. or higher for at least 30 minutes.

DISCLOSURE OF INVENTION

In view of the problems associated with the conventional polymer graphitization process, it is an object of the present invention to provide a thick filmy graphite having excellent physical properties, the filmy graphite being produced by short-time heat treatment at relatively low temperatures.

In order to overcome the problems described above, the present inventors have taken notice of a polyimide which represents a graphitizable polymer, and it has been attempted to graphitize various polyimide films. As a result, it has been found that by controlling the molecular structure and molecular orientation of the polyimide, transformation into a quality graphite is enabled. More specifically, it has been found that the birefringence or coefficient of linear expansion, which is a physical property of a polyimide film, can be the most direct indicator of whether the polyimide film can be transformed into a quality graphite. Here, the coefficient of linear expansion is defined as a coefficient of linear expansion in a direction parallel to the film plane.

That is, according to the present invention, a process for producing a filmy graphite includes the steps of forming a polyimide film having a birefringence of 0.12 or more and heat-treating the polyimide film at 2,400° C. or higher.

Alternatively, a process for producing a filmy graphite may include the steps of forming a polyimide film having a mean coefficient of linear expansion of less than $2.5 \times 10^{-5}/°$ C. in a range of 100° C. to 200° C. the mean coefficient of linear expansion being in a planar direction of the film, and heat-treating the polyimide film at 2,400° C. or higher.

Preferably, a process for producing a filmy graphite includes the steps of forming a polyimide film having a mean coefficient of linear expansion of less than $2.5 \times 10^{-5}/°$ C. in a range of 100° C. to 200° C. the mean coefficient of linear expansion being in a planar direction of the film, and having a birefringence of 0.12 or more, and heat-treating the polyimide film at 2,400° C. or higher.

In the process for producing the filmy graphite, the polyimide film may be formed using, as a starting material, an acid dianhydride represented by chemical formula 1:

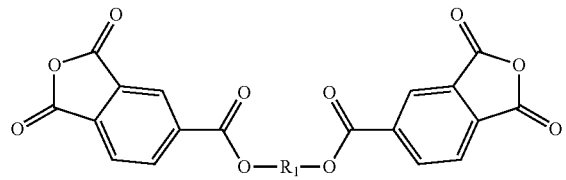
(Chemical Formula 1)

wherein $R_1$ represents any one of divalent organic groups represented by chemical formulae 2:

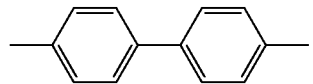
(Chemical Formulae 2)

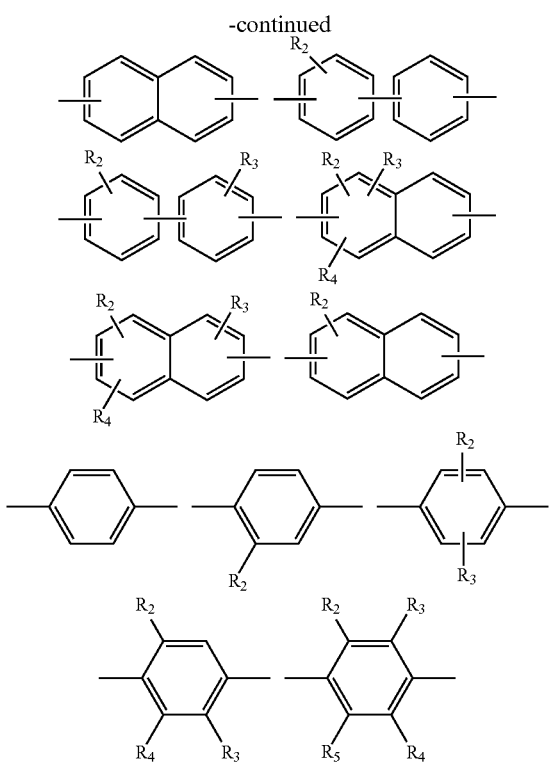

wherein $R_2$, $R_3$, $R_4$, and $R_5$ each represent any one selected from the group consisting of —$CH_3$, —Cl, —Br, —F, and —$OCH_3$.

In the process for producing the filmy graphite, preferably, the polyimide film is formed using, as a starting material, an acid dianhydride represented by chemical formula 3:

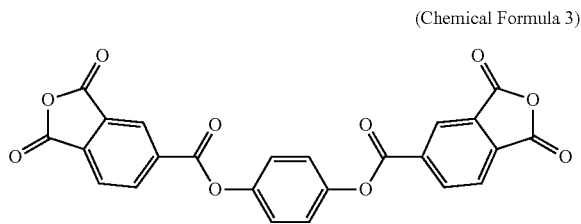 [SMILES: O=C(Oc1ccc(OC(=O)c2ccc3c(c2)C(=O)OC3=O)cc1)c1ccc2c(c1)C(=O)OC2=O]

(Chemical Formula 3)

In the process for producing the filmy graphite, it is also preferable to form the polyimide film using pyromellitic dianhydride or p-phenylenediamine as a starting material. In the process for producing the filmy graphite, the polyimide film may be formed by treating a polyamic acid, which is a precursor, with a dehydrating agent and an imidization accelerator. Preferably, the polyimide film is formed by synthesizing a pre-polymer using a first diamine and an acid dianhydride, the pre-polymer having the acid dianhydride moiety at both termini, synthesizing a polyamic acid by allowing the pre-polymer to react with a second diamine, and imidizing the polyamic acid.

An artificial filmy graphite according to the present invention can have a thickness of 30 μm or more and a thermal diffusivity of $8.5 \times 10^{-4}$ m²/s or more. Preferably, the artificial filmy graphite can have a thickness of 3 μm or more and a thermal diffusivity of $10 \times 10^{-4}$ m²/s or more.

The artificial filmy graphite can have a thickness of 30 μm or more and an electrical conductivity of $8.5 \times 10^4$ S·cm or more. In the filmy graphite, the ratio of electrical resistance at 77 K to that at room temperature can be 1.5 or less, and the ratio of electrical resistance at 4 K to that at room temperature can be 1.4 or less.

The artificial filmy graphite can have a thickness of 30 μm or more and a density of 2.15 g/mm³ or more. In the artificial filmy graphite having a thickness of 30 μm or more, when a light beam with a diameter of 10 μm is applied to the center of a cross section in the thickness direction, with respect to Raman-scattered light, the ratio of peak height at a wave number of 1,310 cm$^{-1}$ to that at a wave number of 1,580 cm$^{-1}$ can be 0.35 or less.

BEST MODE FOR CARRYING OUT THE INVENTION

In a polyimide film used in the present invention, the birefringence Δn, which is associated with in-plane orientation of molecules, is 0.12 or more, preferably 0.14 or more, and most preferably 0.16 or more, in any in-plane direction of the film. The birefringence of the film lower than 0.12 indicates poorer in-plane orientation of molecules of the film. Graphitization of such a film requires heating to a higher temperature and a longer heat-treating time. Furthermore, the resulting filmy graphite tends to have inferior electrical conductivity, thermal conductivity, and mechanical strength.

On the other hand, at a birefringence of 0.12 or more, in particular, 0.14 or more, the maximum temperature can be lowered and the heat-treating time can be shortened. Furthermore, since the resulting filmy graphite has improved crystal orientation, the electrical conductivity, thermal conductivity, and mechanical strength thereof are remarkably improved. Although the reason for this is not clear, it is assumed that rearrangement of molecules is required for graphitization, and in the polyimide having excellent molecular orientation, the required rearrangement of molecules is minimal, thus enabling graphitization at relatively low temperatures.

Herein, the term "birefringence" means a difference between a refractive index in any in-plane direction of a film and a refractive index in the thickness direction. The birefringence Δnx in an in-plane direction X is given by the following expression:

Birefringence Δnx=(refractive index Nx in in-plane direction X)−(refractive index Nz in thickness direction)

Figure 1:
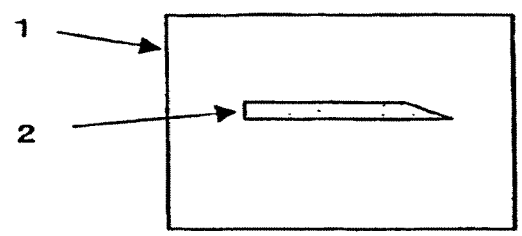
FIG. 1 is a plan view illustrating cutting-out of a specimen for measuring birefringence of a polyimide film.
Figure 2:
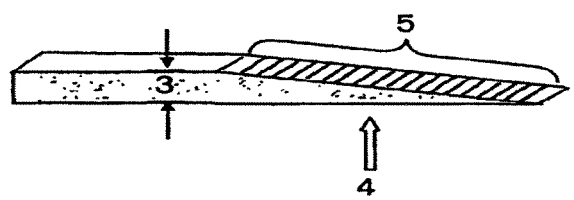
FIG. 2 is a perspective view of the specimen for measuring birefringence cut out as illustrated in FIG. 1.

FIGS. 1 and 2 illustrate a specific method for measuring birefringence. Referring to a plan view of FIG. 1, a wedge-shaped sheet 2 is cut out as a measurement specimen from a film 1. The wedge-shaped sheet 2 has a long trapezoidal shape with an oblique line, and one base angle thereof is a right angle. The wedge-shaped sheet 2 is cut out such that the bottom of the trapezoid is parallel to the X direction. FIG. 2 is a perspective view of the measurement specimen 2 thus cut out. Sodium light 4 is applied at right angles to a cutout cross-section corresponding to the bottom of the trapezoidal specimen 2, and a cutout cross-section corresponding to the oblique line of the trapezoidal specimen 2 is observed with a polarization microscope. Thereby, interference fringes 5 are observed. The birefringence Δnx in the in-plane direction X is represented by the expression:

Δnx=n×λ/d where n is the number of interference fringes, λ is the wavelength of sodium D ray, i.e., 589 nm, and d is the width 3 of the specimen corresponding to the height of the trapezoid of the specimen 2.

Note that the term "in an in-plane direction X of a film" means that, for example, the X direction is any one of in-plane directions of 0 degrees, 45 degrees, 90 degrees, and 135 degrees on the basis of the direction of flow of materials during the formation of the film.

Furthermore, the polyimide film used in the present invention, which is a starting material for the filmy graphite, has a mean coefficient of linear expansion of less than $2.5\times10^{-5}/°$ C. in a range of 100° C. to 200° C. By using such a polyimide film as a starting material, transformation into a graphite starts from 2,400° C. and transformation into a graphite of sufficiently good quality can take place at 2,700° C. Moreover, in comparison with a case in which a polyimide film having a coefficient of linear expansion of $2.5\times10^{-5}/°$ C. or more conventionally known as a starting material for a filmy graphite is used, in the polyimide film having a coefficient of linear expansion of less than $2.5\times10^{-5}/°$ C., transformation into a graphite is enabled at lower temperatures even at the same thickness. That is, even if a film that is thicker than the conventional film is used as a starting material, graphitization is allowed to proceed easily. More preferably, the coefficient of linear expansion is $2.0\times10^{-5}/°$ C. or less.

If the coefficient of linear expansion of the film is $2.5\times10^{-5}/°$ C. or more, the change during heat treatment increases, graphitization becomes disordered, and brittleness occurs. The resulting filmy graphite tends to have low electrical conductivity, thermal conductivity, and mechanical strength. On the other hand, if the coefficient of linear expansion is less than $2.5\times10^{-5}/°$ C., elongation during heat treatment is small, graphitization proceeds smoothly, and brittleness does not occur. As a result, it is possible to obtain a filmy graphite that is excellent in various properties.

Note that the coefficient of linear expansion of the film is obtained by the following method. Using a thermomechanical analyzer (TMA), a specimen is heated to 350° C. at a heating rate of 10° C./min and then air-cooled to room temperature. The specimen is heated again to 350° C. at a heating rate of 10° C./min, and the mean coefficient of linear expansion at 100° C. to 200° C. during the second heating is measured. Specifically, using a thermomechanical analyzer (TMA: SSC/5200H; TMA120C manufactured by Seiko Electronics Industry Co., Ltd.), a film specimen with dimensions of 3 mm in width and 20 mm in length is fixed on a predetermined jig, and measurement is performed in the tensile mode under a load of 3 g in a nitrogen atmosphere.

Furthermore, the polyimide film used in the present invention preferably has an elastic modulus of 350 kgf/mm² or more from the standpoint that graphitization can be more easily performed. That is, if the elastic modulus is 350 kgf/mm² or more, heat treatment can be performed while applying a tension to the polyimide film, and it is possible to avoid breakage of the film resulting from shrinkage of the film during heat treatment. Thus, it is possible to obtain a filmy graphite that is excellent in various properties.

Note that the elastic modulus of the film can be measured in accordance with ASTM-D-882. The polyimide film more preferably has an elastic modulus of 400 kgf/mm² or more, and still more preferably 500 kgf/mm² or more. If the elastic modulus of the film is less than 350 kgf/mm². breakage and deformation easily occur due to shrinkage of the film during heat treatment, and the resulting filmy graphite tends to have low electrical conductivity, thermal conductivity, and mechanical strength.

The polyimide film used in the present invention can be formed by flow-casting an organic solution of a polyamic acid which is a precursor of the polyimide onto a support, such as an endless belt or stainless steel drum, followed by drying and imidization.

A known process can be used as the process for producing the polyamic acid used in the present invention. Usually, at least one aromatic acid dianhydride and at least one diamine are dissolved in substantially equimolar amounts in an organic solvent. The resulting organic solution is stirred under controlled temperature conditions until polymerization between the acid dianhydride and the diamine is completed. Thereby, a polyamic acid is produced. Such a polyamic acid solution is obtained usually at a concentration of 5% to 35% by weight, and preferably 10% to 30% by weight. When the concentration is in such a range, a proper molecular weight and solution viscosity can be obtained.

As the polymerization method, any of the known methods can be used. For example, the following polymerization methods (1) to (5) are preferable.

(1) A method in which an aromatic diamine is dissolved in a polar organic solvent, and a substantially equimolar amount of an aromatic tetracarboxylic dianhydride is allowed to react therewith to perform polymerization.

(2) A method in which an aromatic tetracarboxylic dianhydride and a less than equimolar amount of an aromatic diamine compound with respect thereto are allowed to react with each other in a polar organic solvent to obtain a pre-polymer having acid anhydride groups at both termini. Subsequently, polymerization is performed using an aromatic diamine compound so as to be substantially equimolar with respect to the aromatic tetracarboxylic dianhydride.

(3) A method in which an aromatic tetracarboxylic dianhydride and an excess molar amount of an aromatic diamine compound with respect thereto are allowed to react with each other in a polar organic solvent to obtain a pre-polymer having amino groups at both termini. Subsequently, after adding an additional aromatic diamine compound to the pre-polymer, polymerization is performed using an aromatic tetracarboxylic dianhydride such that the aromatic tetracarboxylic dianhydride and the aromatic diamine compound are substantially equimolar to each other.

(4) A method in which an aromatic tetracarboxylic dianhydride is dissolved and/or dispersed in a polar organic solvent, and then polymerization is performed using an aromatic diamine compound so as to be substantially equimolar to the acid dianhydride.

(5) A method in which a mixture of substantially equimolar amounts of an aromatic tetracarboxylic dianhydride and an aromatic diamine are allowed to react with each other in a polar organic solvent to perform polymerization.

Among these, as in methods (2) and (3), a method in which sequential control is used by way of a pre-polymer to perform polymerization is preferable. The reason for this is that by using sequential control, it is possible to easily obtain a polyimide film having a low birefringence and a low coefficient of linear expansion. By heat-treating this polyimide film, it becomes possible to easily obtain a filmy graphite having excellent electrical conductivity, thermal conductivity, and mechanical strength. Furthermore, it is assumed that since the polymerization reaction is regularly controlled, the overlap between aromatic rings increases, and graphitization is allowed to proceed easily even by low-temperature heat treatment.

In the present invention, examples of the acid dianhydride which can be used for the synthesis of the polyimide include pyromellitic dianhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 2,2-bis(3,4-dicarboxyphenyl)propane dianhydride, 3,4,9,10-perylenetetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfone dianhydride, p-phenylenebis(trimellitic acid monoester anhydride), ethylenebis(trimellitic acid monoester anhydride), bisphenol A bis(trimellitic acid monoester anhydride), and analogues thereof. These may be used alone or in appropriate combination of two or more.

In the present invention, examples of the diamine which can be used for the synthesis of the polyimide include 4,4'-oxydianiline, p-phenylenediamine, 4,4'-diaminodiphenylpropane, 4,4'-diaminodiphenylmethane, benzidine, 3,3'-dichlorobenzidine, 4,4'-diaminodiphenyl sulfide, 3,3'-diaminodiphenyl sulfone, 4,4'-diaminodiphenyl sulfone, 4,4'-diaminodiphenyl ether, 3,3'-diaminodiphenyl ether, 3,4'-diaminodiphenyl ether, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl-N-methylamine, 4,4'-diaminodiphenyl-N-phenylamine, 1,4-diaminobenzene(p-phenylenediamine), 1,3-diaminobenzene, 1,2-diaminobenzene, and analogues thereof. These may be used alone or in appropriate combination of two or more.

In particular, from the standpoint that the coefficient of linear expansion can be decreased, the elastic modulus can be increased, and the birefringence can be increased, use of an acid dianhydride represented by chemical formula 1 below as a starting material is preferable in the production of the polyimide film in the present invention.

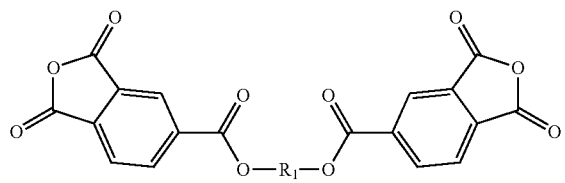
(Chemical Formula 1)

In the formula, $R_1$ represents any one of divalent organic groups represented by chemical formulae 2:

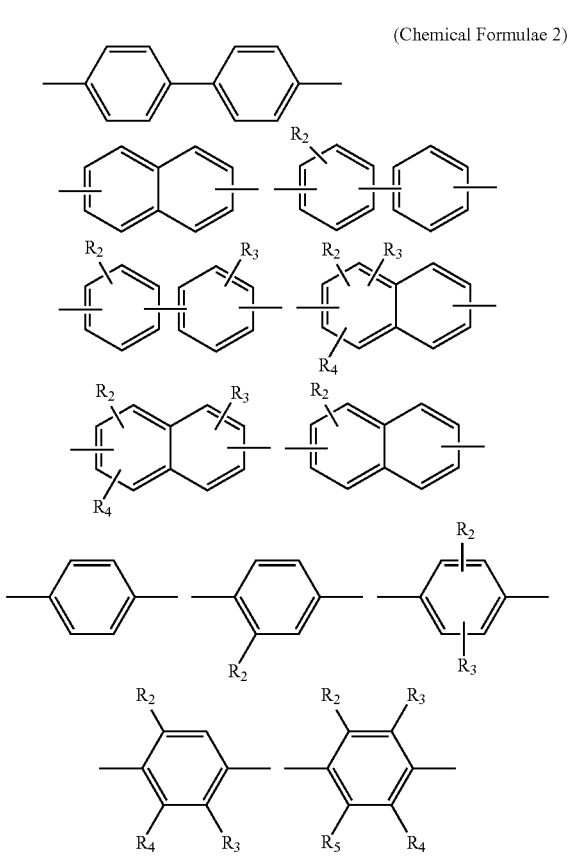
(Chemical Formulae 2)

wherein $R_2$, $R_3$, $R_4$, and $R_5$ each represent any one selected from the group consisting of —$CH_3$, —Cl, —Br, —F, and —$CH_3O$.

By using the acid dianhydride described above, it is possible to obtain a polyimide film having a relatively low coefficient of water absorption, which is also preferable from the standpoint that foaming due to moisture can be prevented in the graphitization process.

In particular, use of any one of the benzene nucleus-containing organic groups represented by chemical formulae 2 as $R_1$ in the acid dianhydride is preferable from the standpoint that the resulting polyimide film has high molecular orientation, a low coefficient of linear expansion, a high elastic modulus, a high birefringence, and a low coefficient of water absorption.

An acid dianhydride represented by molecular formula 3 below may be used as a starting material in the synthesis of the polyimide in the present invention to further decrease the coefficient of linear expansion, increase the elastic modulus, increase the birefringence, and decrease the coefficient of water absorption.

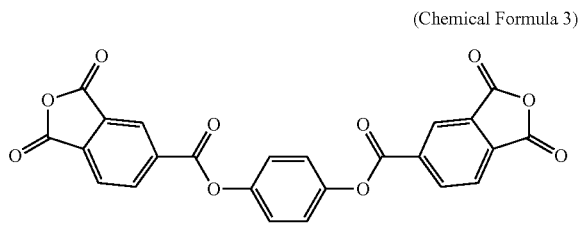 [SMILES: O=C(Oc1ccc(OC(=O)c2ccc3c(c2)C(=O)OC3=O)cc1)c1ccc2c(c1)C(=O)OC2=O]

(Chemical Formula 3)

In particular, with respect to a polyimide film produced using, as a starting material, an acid dianhydride having a structure in which benzene rings are linearly bonded by two or more ester bonds, although folded chains are involved, a highly linear conformation is easily formed as a whole, and the polyimide film has a relatively rigid property. As a result, by using this starting material, it is possible to decrease the coefficient of linear expansion of the polyimide film, for example, to $1.5 \times 10^{-5}/°$ C. or less. In addition, the elastic modulus can be increased to 500 kgf/mm$^2$ or more, and the coefficient of water absorption can be decreased to 1.5% or less.

The polyimide of the present invention is preferably synthesized using p-phenylenediamine as a starting material to further decrease the coefficient of linear expansion, increase the elastic modulus, and increase the birefringence.

In the present invention, the acid dianhydride most suitably used for the synthesis of the polyimide film includes pyromellitic dianhydride and/or p-phenylenebis(trimellitic acid monoester dianhydride) represented by (Chemical Formula 3). The number of moles of one of these or both is preferably 40 mole percent or more, more preferably 50 mole percent or more, even more preferably 70 mole percent or more, and still more preferably 80 mole percent or more relative to the total acid dianhydride content. If the amount of use of these acid dianhydrides is less than 40 mole percent, the resulting polyimide film tends to have an increased coefficient of linear expansion, a decreased elastic modulus, and a decreased birefringence.

Furthermore, in the present invention, the diamine most suitably used for the synthesis of the polyimide includes 4,4'-oxydianiline and p-phenylenediamine. The number of moles of one of these or both is preferably 40 mole percent or more, more preferably 50 mole percent or more, even more preferably 70 mole percent or more, and still more preferably 80 mole percent or more relative to the total diamine content. Furthermore, p-phenylenediamine is included preferably in an amount of 10 mole percent or more, more preferably 20 mole percent or more, even more preferably 30 mole percent or more, and still more preferably 40 mole percent or more. If the contents of these diamines are below the lower limits of these mole percent ranges, the resulting polyimide film tends to have an increased coefficient of linear expansion, a decreased elastic modulus, and a decreased birefringence. However, if the total diamine content is entirely composed of p-phenylenediamine, it is difficult to obtain a thick polyimide film which does not substantially foam. Therefore, use of 4,4'-oxydianiline is preferable.

Preferred examples of the solvent for the synthesis of the polyamic acid include amide solvents, such as N,N-dimethylformamide. N,N-dimethylacetamide, and N-methyl-2-pyrrolidone, and N,N-dimethylformamide and N,N-dimethylacetamide are particularly preferably used.

The polyimide may be produced using either a thermal cure method or a chemical cure method. In the thermal cure method, a polyamic acid, which is a precursor, is imidized by heating. In the chemical cure method, a polyamic acid is imidized using a dehydrating agent represented by an acid anhydride, such as acetic anhydride, and a tertiary amine, such as picoline, quinoline, isoquinoline, or pyridine, as an imidization accelerator. Above all, a tertiary amine having a higher boiling point, such as isoquinoline, is more preferable. The reason for this is that such a tertiary amine is not evaporated in the initial stage of the production process of the film and tends to exhibit a catalytic effect until the final step of drying.

In particular, from the standpoints that the resulting film tends to have a low coefficient of linear expansion, a high elastic modulus, and a high birefringence and that rapid graphitization is enabled at relatively low temperatures and a quality graphite can be obtained, chemical curing is preferable. Furthermore, combined use of the dehydrating agent and the imidization accelerator is preferable because the resulting film can have a decreased coefficient of linear expansion, an increased elastic modulus, and an increased birefringence. Moreover, in the chemical cure method, since imidization reaction proceeds more rapidly, the imidization reaction can be completed for a short period of time in heat treatment. Thus, the chemical cure method has high productivity and is industrially advantageous.

In a specific process for producing a film using chemical curing, first, stoichiometric amounts or more of a dehydrating agent and an imidization accelerator composed of a catalyst are added to a polyamic acid solution, the solution is flow-cast or applied onto a support, e.g., a supporting plate, an organic film, such as PET, a drum, or an endless belt, so as to be formed into a film, and an organic solvent is evaporated to obtain a self-supporting film. Subsequently, the self-supporting film is imidized while drying by heating to obtain a polyimide film. The heating temperature is preferably in a range of 150° C. to 550° C.

Although the heating rate is not particularly limited, preferably, gradual heating is performed continuously or stepwise so that the highest temperature reaches the predetermined temperature range. The heating time depends on the thickness of the film and the highest temperature. In general, the heating time is preferably 10 seconds to 10 minutes after the highest temperature is achieved. Moreover, it is preferable to include a step of fixing and drawing the film in order to prevent shrinkage in the production process of the polyimide film because the resulting film tends to have a small coefficient of linear expansion, a high elastic modulus, and a high birefringence.

In the graphitization process of the polyimide film, in the present invention, the polyimide film, which is a starting material, is subjected to preheat treatment under reduced pressure or in nitrogen gas to perform carbonization. The preheating is usually carried out at about 1,000° C., and for example, when the temperature is raised at a rate of 10° C./min, preferably, the film is retained for about 30 minutes in a temperature range of about 1,000° C. In the stage of temperature rise, in order to prevent loss of molecular orientation of the starting polymer film, preferably, a pressure is applied in a direction perpendicular to the surface of the film to an extent that does not cause breakage of the film.

Subsequently, the carbonized film is set in a very high temperature oven to perform graphitization. The graphitization is performed in an inert gas. As the inert gas, argon is suitable, and addition of a small amount of helium to argon is more preferable. The heat treatment temperature required is at least 2,400° C. at the minimum, and heat treatment is finally performed preferably at a temperature of 2,700° C. or higher, and more preferably 2.800° C. or higher.

As the heat treatment temperature is increased, transformation into a quality graphite is more easily enabled. However, in view of economics, preferably, transformation into a quality graphite is enabled at temperatures as low as possible. In order to achieve a very high temperature of 2,500° C. or higher, usually, a current is directly applied to a graphite heater and heating is performed using the resulting Joule heat. Deterioration of the graphite heater advances at 2,700° C. or higher. At 2,800° C., the deterioration rate increases about tenfold, and at 2,900° C., the deterioration rate increases further about tenfold. Consequently, it brings about a large economical advantage to decrease the temperature at which transformation into a quality graphite is enabled, for example, from 2,800° C. to 2,700° C., by improving the polymer film as the starting material. Note that in a generally available industrial oven, the maximum temperature at which heat treatment can be performed is limited to 3,000° C.

In the graphitization treatment, the carbonized film produced by the preheat treatment is transformed so as to have a graphite structure. During this treatment, cleavage and recombination of carbon-carbon bonds must occur. In order to cause graphitization at temperatures as low as possible, it is necessary to allow the cleavage and recombination to occur at minimum energy. The molecular orientation of the starting polyimide film affects the arrangement of carbon atoms in the carbonized film, and the molecular orientation can produce an effect of decreasing the energy of cleavage and recombination of carbon-carbon bonds during graphitization. Consequently, by designing molecules so that high molecular orientation easily occurs, graphitization at relatively low temperatures is enabled. By using two-dimensional molecular orientation parallel to the surface of the film, the effect of the molecular orientation becomes more remarkable.

The second characteristic of the graphitization reaction is that graphitization does not easily proceed at low temperatures if the carbonized film is thick. Consequently, when a thick carbonized film is graphitized, a state may occur in which the graphite structure is formed in a surface layer while the graphite structure is not formed yet in an interior region. The molecular orientation of the carbonized film promotes graphitization in the interior region of the film, and as a result, transformation into a quality graphite is enabled at lower temperatures.

Substantially simultaneous progress of graphitization in the surface layer and in the interior region of the carbonized film is also useful in avoiding the situation in which the graphite structure formed in the surface layer is destroyed by a gas generated from inside, and graphitization of a thicker film is enabled. The polyimide film formed in the present invention is believed to have molecular orientation that is most suitable for producing such an effect.

As described above, by using the polyimide film formed in the present invention, it becomes possible to graphitize a film that is thicker than conventional graphitizable polyimide films. Specifically, even in a film with a thickness of 200 μm, transformation into a quality filmy graphite is enabled by selecting an appropriate heat treatment.

Various examples of the present invention together with several comparative examples will be described below.

EXAMPLE 1

Pyromellitic dianhydride (4 equivalents) was dissolved in a solution prepared by dissolving 3 equivalents of 4,4'-oxydianiline and 1 equivalent of p-phenylenediamine in dimethylformamide (DMF) to produce a solution containing 18.5% by weight of polyamic acid.

While cooling the resulting solution, an imidization catalyst containing 1 equivalent of acetic anhydride and 1 equivalent of isoquinoline, relative to the carboxylic acid group contained in the polyamic acid, and DMF was added thereto, followed by defoaming. Subsequently, the resulting mixed solution was applied onto an aluminum foil such that a predetermined thickness was achieved after drying. The mixed solution layer on the aluminum foil was dried using a hot-air oven and a far-infrared heater.

The drying conditions for achieving a final thickness of 75 μm were as follows. The mixed solution layer on the aluminum foil was dried in a hot-air oven at 120° C. for 240 seconds to produce a self-supporting gel film. The resulting gel film was stripped off from the aluminum foil and fixed on a frame. The gel film was dried by heating stepwise in a hot-air oven at 120° C. for 30 seconds, at 275° C. for 40 seconds, at 400° C. for 43 seconds, and at 450° C. for 50 seconds, and with a far-infrared heater at 460° C. for 23 seconds. With respect to other thicknesses, the firing time was adjusted in proportion to the thickness. For example, in the case of a film with a thickness of 25 μm, the firing time was decreased to one third, compared with the case of 75 μm.

Five types of polyimide films with thicknesses of 25 μm, 50 μm, 75 μm, 100 μm, and 200 μm (Sample A: elastic modulus 400 kgf/mm², coefficient of water absorption>2.0%) were produced.

Sample A was sandwiched between graphite plates, and using a very high temperature oven provided with a graphite heater, preliminary treatment was performed in which the temperature was raised to 1,000° C. at a rate of 16.7° C./min under reduced pressure. Subsequently, using a very high temperature oven, under a pressurized argon atmosphere of 0.8 kgf/cm², the temperature was raised to 2,700° C. at a rate of 7° C./min. Furthermore, under a pressurized argon atmosphere of 0.8 kgf/cm², the temperature was raised to 2,800° C., the maximum temperature, at a rate of 2° C./min, and Sample A was retained for one hour at the maximum temperature. Cooling was then performed to obtain filmy graphites.

The progress of graphitization was determined by measuring electrical conductivity and thermal diffusivity in a planar direction of the film. That is, higher electrical conductivity and higher thermal diffusivity indicate increased graphitization. The results thereof are shown in Table 1. In the case of the polyimide (Sample A) in Example 1, the heat treatment at 2,700° C. already causes transformation into quality graphites, and excellent electrical conductivity and thermal conductivity are exhibited. As is evident from the results, by using the polyimide of Example 1, it is possible to graphitize a polyimide film that is thicker than a polyimide film of conventional Kapton (registered trademark) type shown in Comparative Example 1 which will be described below, and transformation into a quality graphite is enabled even at a temperature of 2,700° C., which is 100° C. lower than the common graphitization temperature of the Kapton type polyimide film, i.e., 2,800° C.

The electrical conductivity was measured by the four-terminal method. Specifically, a filmy graphite sample with a size of about 3 mm×6 mm was prepared. After confirming that no breaks or wrinkles were present with an optical microscope, a pair of outer electrodes were attached to both ends of the sample using silver paste, and a pair of inner electrodes were attached inside between the outer electrodes using silver paste. Using a constant current source ("Programmable Current Source 220" available from Keithley Instruments, Inc.), a constant current of 1 mA was applied between the outer electrodes, and the voltage between the inner electrodes was measured with a voltmeter ("Nanovoltmeter" available from Keithley Instruments, Inc.). The electrical conductivity was calculated according to the expression: (applied current/measured voltage)×(distance between inner electrodes/cross-sectional area of sample).

The thermal diffusivity was measured with a thermal diffusivity meter using an AC method ("LaserPit" available from ULVAC-RIKO, Inc.), under an atmosphere of 20° C., at 10 Hz.

TABLE 1

| Heat treatment temperature (° C.) | Starting film Thickness (μm) | Coefficient of linear expansion (×10⁻⁵/° C.) | Birefringence | Electrical conductivity (S · cm) | Thermal diffusivity (10⁻⁴ m²/s) |
|---|---|---|---|---|---|
| 2700 | 25 | 1.8 | 0.14 | 11,500 | 8.4 |
|  | 50 | 1.8 | 0.14 | 11,000 | 8.3 |
|  | 75 | 1.9 | 0.14 | 10,000 | 8.1 |
|  | 100 | 1.9 | 0.14 | 9,700 | 8.0 |
|  | 200 | 2.0 | 0.14 | 9,800 | 8.0 |
| 2800 | 25 | 1.8 | 0.14 | 12,000 | 8.7 |
|  | 50 | 1.8 | 0.14 | 11,000 | 8.5 |
|  | 75 | 1.9 | 0.14 | 11,000 | 8.5 |
|  | 100 | 1.9 | 0.14 | 10,500 | 8.5 |
|  | 200 | 2.0 | 0.14 | 10,000 | 8.5 |

COMPARATIVE EXAMPLE 1

Pyromellitic dianhydride (1 equivalent) was dissolved in a solution prepared by dissolving 1 equivalent of 4,4'-oxydianiline in DMF to produce a solution containing 18.5% by weight of polyamic acid.

While cooling the resulting solution, an imidization catalyst containing 1 equivalent of acetic anhydride and 1 equivalent of isoquinoline, relative to the carboxylic acid group contained in the polyamic acid, and DMF was added thereto, followed by defoaming. Subsequently, the resulting mixed solution was applied onto an aluminum foil such that a predetermined thickness was achieved after drying. The mixed solution layer on the aluminum foil was dried using a hot-air oven and a far-infrared heater.

The drying conditions for achieving a final thickness of 75 μm were as follows. The mixed solution layer on the aluminum foil was dried in a hot-air oven at 120° C. for 240 seconds to produce a self-supporting gel film. The resulting gel film was stripped off from the aluminum foil and fixed on a frame. The gel film was dried by heating stepwise in a hot-air oven at 120° C. for 30 seconds, at 275° C. for 40 seconds, at 400° C. for 43 seconds, and at 450° C. for 50 seconds, and with a far-infrared heater at 460° C. for 23 seconds. With respect to other thicknesses, the firing time was adjusted in proportion to the thickness. For example, in the case of a film with a thickness of 25 μm, the firing time was decreased to one third, compared with the case of 75 μm.

Five types of conventional polyimide films of typical Kapton (registered trademark) type with thicknesses of 25 μm, 50 μm, 75 μm, 100 μm, and 200 μm (elastic modulus 300 kgf/mm², coefficient of water absorption>2.0%) were produced. Using these films, graphitization was performed also in this comparative example by the same method as that in Example 1.

The properties of the filmy graphites produced in Comparative Example 1 are shown in Table 2. As is evident from Table 2, when the films with a thickness of 75 μm or more are used, the resulting graphites have poor electrical conductivity and thermal diffusivity. Only in the polyimide films with thicknesses of 25 μm and 50 μm, high graphitization is achieved. As is also evident from Table 2, the properties of the graphitized films obtained by the heat treatment at 2,700° C. are considerably inferior to those of the case in which the polyimide (Sample A) of Example 1 is used.

From the comparison between Comparative Example 1 and Example 1 described above, the superiority of the polyimide of the present invention in the graphitization reaction is apparent.

TABLE 2

| Heat treatment temperature (° C.) | Starting film Thickness (μm) | Coefficient of linear expansion (×10⁻⁵/° C.) | Birefringence | Electrical conductivity (S · cm) | Thermal diffusivity (10⁻⁴ m²/s) |
|---|---|---|---|---|---|
| 2700 | 25 | 3.2 | 0.11 | 9,500 | 7.2 |
|  | 50 | 3.1 | 0.10 | 9,000 | 6.3 |
|  | 75 | 3.2 | 0.10 | 5,000 | 4.0 |
|  | 100 | 3.1 | 0.10 | 1,200 | 2.0 |
|  | 200 | 3.1 | 0.10 | 800 | 1.5 |
| 2800 | 25 | 3.2 | 0.11 | 11,500 | 8.0 |
|  | 50 | 3.1 | 0.10 | 10,000 | 7.8 |
|  | 75 | 3.2 | 0.10 | 7,000 | 4.5 |
|  | 100 | 3.1 | 0.10 | 4,500 | 3.0 |
|  | 200 | 3.1 | 0.10 | 1,000 | 1.8 |

EXAMPLE 2

Pyromellitic dianhydride (3 equivalents) was dissolved in a solution prepared by dissolving 2 equivalents of 4,4'-oxydianiline and 1 equivalent of p-phenylenediamine in dimethylformamide (DMF) to produce a solution containing 15% by weight of polyamic acid.

While cooling the resulting solution, an imidization catalyst containing 1 equivalent of acetic anhydride and 1 equivalent of isoquinoline, relative to the carboxylic acid group contained in the polyamic acid, and DMF was added thereto, followed by defoaming. Subsequently, the resulting mixed solution was applied onto an aluminum foil such that a predetermined thickness was achieved after drying. The mixed solution layer on the aluminum foil was dried using a hot-air oven and a far-infrared heater.

The drying conditions for achieving a final thickness of 75 μm were as follows. The mixed solution layer on the aluminum foil was dried in a hot-air oven at 120° C. for 240 seconds to produce a self-supporting gel film. The resulting gel film was stripped off from the aluminum foil and fixed on a frame. The gel film was dried by heating stepwise in a hot-air oven at 120° C. for 30 seconds, at 275° C. for 40 seconds, at 400° C. for 43 seconds, and at 450° C. for 50 seconds, and with a far-infrared heater at 460° C. for 23 seconds. With respect to other thicknesses, the firing time was adjusted in proportion to the thickness. For example, in the case of a film with a thickness of 25 μm, the firing time was decreased to one third, compared with the case of 75 μm.

When compared with Example 1, the percentage of p-phenylenediamine, i.e., a rigid component, was high in Example 2, and the resulting polyimide films had higher molecular orientation. Consequently, in the case of thick films, the solvent and the catalyst were caught in the resin, and foaming easily occurred because of the evaporation of the solvent of the polyimide film and the imidization catalyst. In order to prevent foaming, it was necessary to set the firing time at low temperatures to be sufficiently long.

Four types of polyimide films with thicknesses of 25 μm, 50 μm, 75 μm, and 100 μm (Sample B: elastic modulus 450 kg/mm$^2$, coefficient of water absorption>2.0%) were produced. Using these films, graphitization was performed also in Example 2 by the same method as that in Example 1.

The properties of the filmy graphites produced in Example 2 are shown in Table 3. As is evident from comparison between Tables 3 and 1, the properties of the filmy graphites obtained in Example 2 are slightly superior to those in Example 1.

EXAMPLE 3

Pyromellitic dianhydride (1 equivalent) and p-phenylenebis(trimellitic acid monoester anhydride) were dissolved in a solution prepared by dissolving 1 equivalent of 4,4'-oxydianiline and 1 equivalent of p-phenylenediamine in DMF to produce a solution containing 15% by weight of polyamic acid.

While cooling the resulting solution, an imidization catalyst containing 1 equivalent of acetic anhydride and 1 equivalent of isoquinoline, relative to the carboxylic acid group contained in the polyamic acid, and DMF was added thereto, followed by defoaming. Subsequently, the resulting mixed solution was applied onto an aluminum foil such that a predetermined thickness was achieved after drying. The mixed solution layer on the aluminum foil was dried using a hot-air oven and a far-infrared heater.

The drying conditions for achieving a final thickness of 75 μm were as follows. The mixed solution layer on the aluminum foil was dried in a hot-air oven at 120° C. for 240 seconds to produce a self-supporting gel film. The resulting gel film was stripped off from the aluminum foil and fixed on a frame. The gel film was dried by heating stepwise in a hot-air oven at 120° C. for 30 seconds, at 275° C. for 40 seconds, at 400° C. for 43 seconds, and at 450° C. for 50 seconds, and with a far-infrared heater at 460° C. for 23 seconds. With respect to other thicknesses, the firing time was adjusted in proportion to the thickness. For example, in the case of a film with a thickness of 25 μm, the firing time was decreased to one third, compared with the case of 75 μm.

When compared with Example 1, the resulting polyimide films had higher molecular orientation in Example 3. Consequently, in the case of thick films, the solvent and the catalyst were caught in the resin, and foaming easily occurred because of evaporation of the solvent of the polyimide film and the imidization catalyst. In order to prevent foaming, it was necessary to set the firing time at low temperatures to be sufficiently long.

Four types of polyimide films with thicknesses of 25 μm, 50 μm, 75 μm, and 100 μm (Sample C: elastic modulus 500 kg/mm$^2$, coefficient of water absorption>1.5%) were produced. Using these films, graphitization was performed also in Example 3 by the same method as that in Example 1.

The properties of the filmy graphites produced in Example 3 are shown in Table 4. As is evident from comparison between Tables 4 and 1, the properties of the filmy graphites obtained in Example 3 were substantially the same as those in Example 1.

TABLE 3

| Heat treatment temperature (° C.) | Starting film | | | Electrical conductivity (S · cm) | Thermal diffusivity ($10^{-4}$ m$^2$/s) |
| --- | --- | --- | --- | --- | --- |
| | Thickness (μm) | Coefficient of linear expansion ($\times 10^{-5}$/° C.) | Birefringence | | |
| 2700 | 25 | 1.2 | 0.15 | 11,500 | 8.5 |
| | 50 | 1.1 | 0.16 | 11,000 | 8.3 |
| | 75 | 1.2 | 0.16 | 10,000 | 8.2 |
| | 100 | 1.1 | 0.15 | 9,700 | 8.1 |
| 2800 | 25 | 1.2 | 0.15 | 12,500 | 8.9 |
| | 50 | 1.1 | 0.16 | 11,000 | 8.8 |
| | 75 | 1.2 | 0.16 | 10,500 | 8.7 |
| | 100 | 1.1 | 0.15 | 10,500 | 8.7 |

TABLE 4

| Heat treatment temperature (° C.) | Starting film | | | Electrical conductivity (S · cm) | Thermal diffusivity ($10^{-4}$ m$^2$/s) |
| --- | --- | --- | --- | --- | --- |
| | Thickness (μm) | Coefficient of linear expansion ($\times 10^{-5}$/° C.) | Birefringence | | |
| 2700 | 25 | 0.9 | 0.16 | 10,000 | 8.3 |
| | 50 | 1.0 | 0.16 | 10,000 | 8.3 |
| | 75 | 0.9 | 0.15 | 9,500 | 8.1 |
| | 100 | 1.0 | 0.15 | 9,300 | 8.1 |
| 2800 | 25 | 0.9 | 0.16 | 11,300 | 8.5 |
| | 50 | 1.0 | 0.16 | 11,000 | 8.3 |
| | 75 | 0.9 | 0.15 | 10,000 | 8.2 |
| | 100 | 1.0 | 0.15 | 9,500 | 8.2 |

EXAMPLE 4

Pyromellitic dianhydride (4 equivalents) was dissolved in a solution prepared by dissolving 3 equivalents of 4,4'-oxydianiline and 1 equivalent of p-phenylenediamine in dimethylformamide (DMF) to produce a solution containing 18.5% by weight of polyamic acid.

While cooling the resulting solution, an imidization catalyst containing 1 equivalent of isoquinoline relative to the carboxylic acid group contained in the polyamic acid and DMF was added thereto, followed by defoaming. Subsequently, the resulting mixed solution was applied onto an aluminum foil such that a predetermined thickness was achieved after drying. The mixed solution layer on the aluminum foil was dried using a hot-air oven.

The drying conditions for achieving a final thickness of 75 μm were as follows. The mixed solution layer on the aluminum foil was dried in a hot-air oven at 120° C. for 240 seconds to produce a self-supporting gel film. The resulting gel film was stripped off from the aluminum foil and fixed on a frame. The gel film was dried by heating stepwise in a hot-air oven at 120° C. for 30 minutes, at 275° C. for 30 minutes, at 400° C. for 30 minutes, and at 450° C. for 30 minutes. With respect to other thicknesses, the firing time was adjusted in proportion to the thickness. For example, in the case of a film with a thickness of 25 μm, the firing time was decreased to one third, compared with the case of 75 μm. Furthermore, when the thickness of the film was large, in order to prevent foaming because of the evaporation of the solvent of the polyimide film and the imidization catalyst, the firing time at low temperatures was set to be sufficiently long. In particular, when acetic anhydride is not added as in Example 4, the reaction proceeds slowly and the polarity does not change. As a result, the exudation of the solvent and the catalyst slows down, and foaming easily occurs during the formation of the polyimide film. Consequently, when a thick polyimide film is formed, adequate attention must be paid to the drying conditions.

Four types of polyimide films with thicknesses of 25 μm, 50 μm, 75 μm, and 100 μm (Sample D: elastic modulus 380 kg/mm$^2$, coefficient of water absorption>2.2%) were produced. Using these films, graphitization was performed also in Example 4 by the same method as that in Example 1.

The properties of the filmy graphites produced in Example 4 are shown in Table 5. As is evident from comparison between Tables 5 and 1, the properties of the filmy graphites obtained in Example 4 are slightly inferior to those in Example 1, but are superior to those in Comparative Example.

TABLE 5

| Heat treatment temperature (° C.) | Starting film | | | Electrical conductivity (S · cm) | Thermal diffusivity ($10^{-4}$ m$^2$/s) |
| --- | --- | --- | --- | --- | --- |
| | Thickness (μm) | Coefficient of linear expansion ($\times 10^{-5}$/° C.) | Birefringence | | |
| 2700 | 25 | 2.0 | 0.13 | 10,500 | 8.0 |
| | 50 | 2.0 | 0.13 | 10,000 | 7.8 |
| | 75 | 2.0 | 0.13 | 9,200 | 7.8 |
| | 100 | 2.1 | 0.13 | 8,000 | 7.8 |
| 2800 | 25 | 2.0 | 0.13 | 11,500 | 8.5 |
| | 50 | 2.0 | 0.13 | 10,500 | 8.1 |
| | 75 | 2.0 | 0.13 | 9,500 | 8.1 |
| | 100 | 2.1 | 0.13 | 8,500 | 8.1 |

EXAMPLE 5

In Example 5, polyimide films manufactured by Kaneka Corporation and sold under the trade name of APICAL NPI with various thicknesses were graphitized by the same method as that in Example 1.

APICAL NPI was produced as follows. Pyromellitic dianhydride (4 equivalents) was dissolved in a solution prepared by dissolving 3 equivalents of 4,4'-oxydianiline in DMF to synthesize a pre-polymer having acid anhydrides at both termini. Subsequently, by dissolving 1 equivalent of p-phenylenediamine in a solution containing the pre-polymer, a solution containing 18.5% by weight of polyamic acid was prepared.

While cooling the resulting solution, an imidization catalyst containing 1 equivalent of isoquinoline relative to the carboxylic acid group contained in the polyamic acid and DMF was added thereto, followed by defoaming. Subsequently, the resulting mixed solution was applied onto an aluminum foil such that a predetermined thickness was achieved after drying. The mixed solution layer on a metal belt was dried using a hot-air oven and a far-infrared heater.

The drying conditions for achieving a final thickness of 75 μm were as follows. The mixed solution layer on the metal belt was dried in a hot-air oven at 120° C. for 240 seconds to produce a self-supporting gel film. The resulting gel film was stripped off from the metal belt, and the ends of the gel film were fixed. The gel film was dried by heating stepwise in a hot-air oven at 120° C. for 30 seconds, at 275° C. for 40 seconds, at 400° C. for 43 seconds, and at 450° C. for 50 seconds, and with a far-infrared heater at 460° C. for 23 seconds. With respect to other thicknesses, the firing time was adjusted in proportion to the thickness. For example, in the case of a film with a thickness of 25 μm, the firing time was decreased to one third, compared with the case of 75 μm.

Five types of sequential-controlled polyimide films with thicknesses of 12.5 μm, 25 μm, 50 μm, 75 μm, and 125 μm (Sample E: elastic modulus 380 kgf/mm$^2$, coefficient of water absorption 2.2%, birefringence 0.14, coefficient of linear expansion $1.6 \times 10^{-5}$/° C.) were produced. Using these films, graphitization was performed also in Example 5 by the same method as that in Example 1 except that the heat treatment temperature was set at 2,800° C. or 3,000° C. in Example 5.

Various physical properties of the filmy graphites obtained in Example 5 are shown in Table 6. As is evident from comparison between Table 6 and Tables 1 to 5, the properties of the filmy graphites in Example 5 are superior not only to those of Comparative Example 1 but also to those of Examples 1 to 4. Of course, as graphitization proceeds, the density and electrical conductivity tend to increase. In Table 6, ρ(77K)/ρ(rt) and ρ(4K)/ρ(rt) respectively indicate the ratio of electrical resistance at 77 K to that at room temperature and the ratio of the electrical resistance at 4 K to that at room temperature. These electrical resistance ratios tend to decrease as graphitization proceeds.

Furthermore, the thermal conductivity and the thermal diffusivity tend to increase as graphitization proceeds, and these properties are directly important when the filmy graphite is used as a heat-dissipating film. Here, the thermal conductivity (W/(m·K)) was calculated by multiplying the thermal diffusivity (m$^2$/s) times the density (kg/m$^3$), and times the specific heat (theoretical value: 0.709 kJ/(kg·K)). The density was calculated by dividing the weight by the volume.

The Raman spectrum intensity ratio in Table 6 is represented by the ratio of the spectrum peak at a wave number of 1,310 cm$^{-1}$ corresponding to the diamond bond to the spectrum peak at a wave number of 1,580 cm$^{-1}$ corresponding to the graphite bond. Of course, the lower spectrum peak ratio indicates higher graphitization. In the Raman measurement, a light beam with a diameter of 10 μm was applied to the center of a cross section in the thickness direction of the filmy graphite.

Figure 3:
FIG. 3 is a bright-field image of a filmy graphite in the vicinity of a surface layer in an example of the present invention, the image being observed with a transmission electron microscope (TEM).

FIG. 3 is a bright-field image of a filmy graphite in the vicinity of a surface layer, the filmy graphite being obtained by heat treatment at 3,000° C. of the polyimide film with a thickness of 125 μm in Example 5, the image being observed with a transmission electron microscope (TEM). In the TEM observation, the filmy graphite was embedded in a protective resin to prepare a specimen for observing a cross section in the thickness direction of the graphite layer. In FIG. 3, arrows indicate a boundary between the protective resin and the graphite layer.

As is evident from the layered contrast of the TEM photograph, the graphite layer has a single-crystal structure in which the crystallographic (0001) plane (also referred to as the "c-plane", in general) is parallel to the surface. In FIG. 3, delaminations along the c-plane are observed. These delaminations are caused by unexpected external force during the preparation and handling of the specimen for the microscope. The fact that such delaminations easily occur means that graphite crystallization has proceeded to a high degree and breaking easily occurs along the c-plane.

Figure 4:
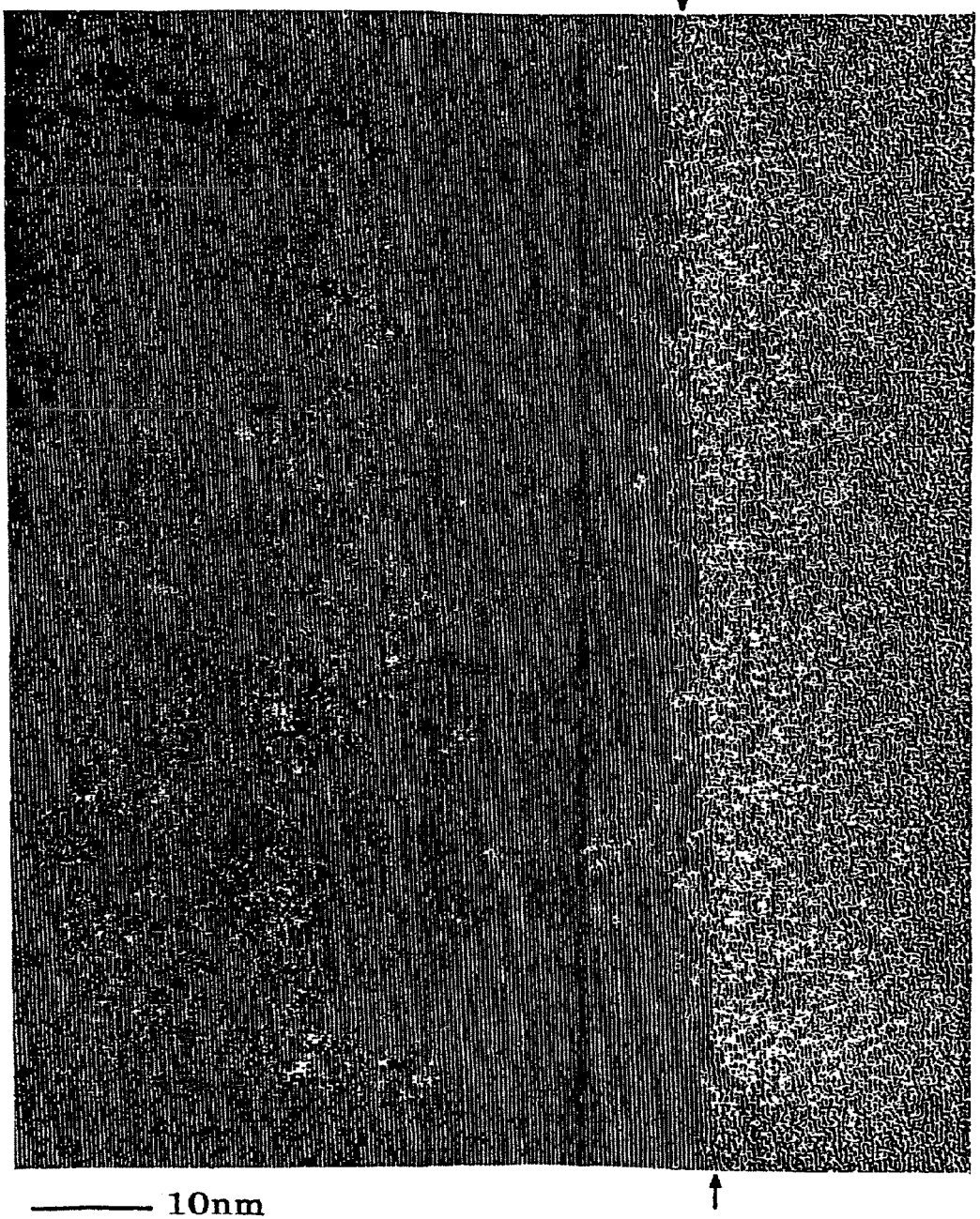
FIG. 4 is a lattice image of a filmy graphite in the vicinity of a surface layer in an example of the present invention, the image being observed with a TEM.

FIG. 4 is a crystal lattice image observed with a TEM in the vicinity of the surface layer corresponding to FIG. 3. In FIG. 4, a linear lattice image corresponding to the c-plane of the graphite is shown with a clear contrast and it can be confirmed that the linear lattice extends parallel to the surface.

Figure 5:
FIG. 5 is a bright-field image of a filmy graphite in the vicinity of a center in the thickness direction in an example of the present invention, the image being observed with a TEM.
Figure 6:
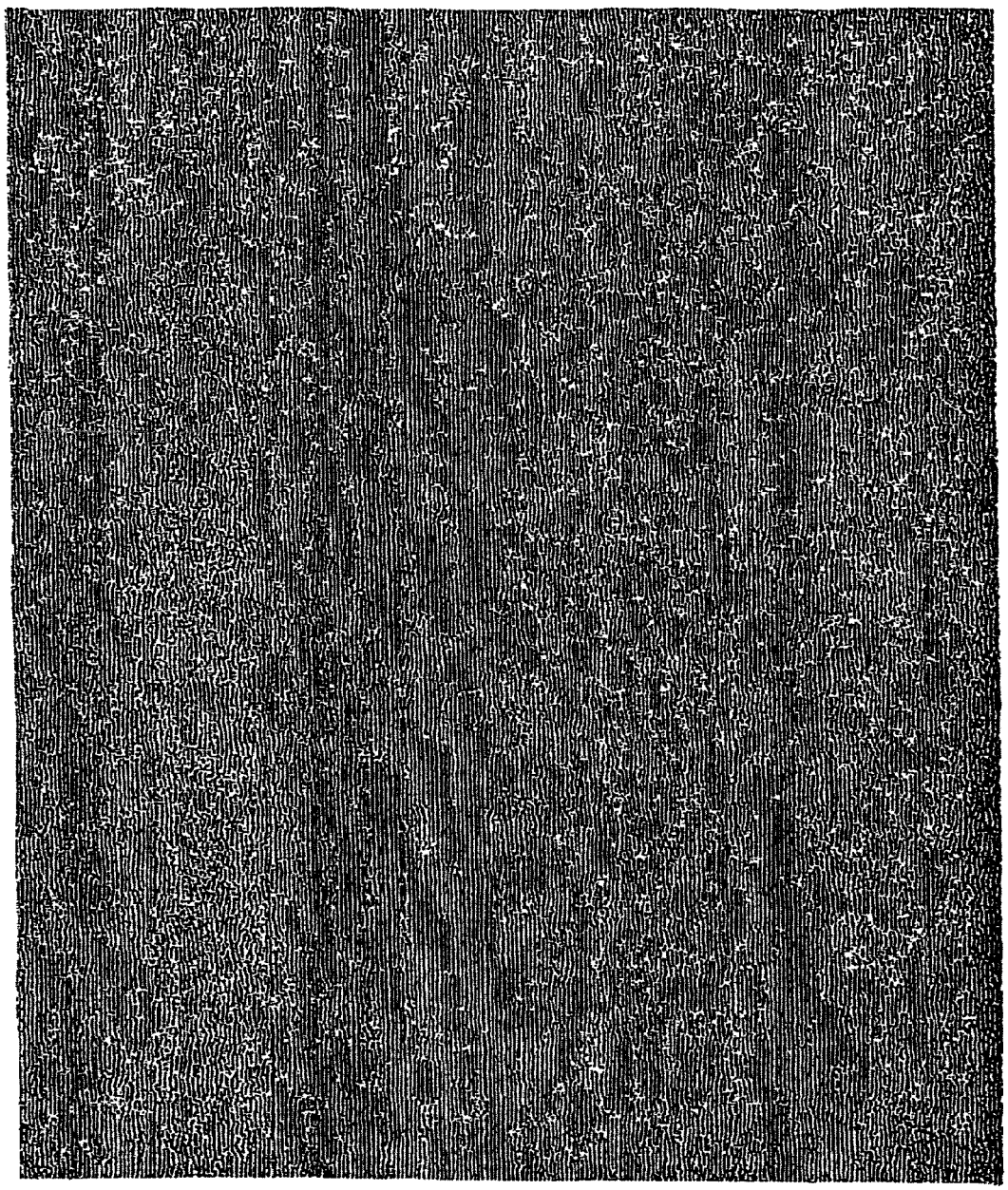
FIG. 6 is a lattice image of a filmy graphite in the vicinity of a center in the thickness direction in an example of the present invention, the image being observed with a TEM.

FIG. 5, similar to FIG. 3, is a bright-field image of a filmy graphite in the vicinity of a center in the thickness direction, the image being observed with a TEM. As is evident from the TEM photograph, the same graphite single-crystal structure as that of the surface layer is also formed in the vicinity of the center in the thickness direction. In FIG. 5, similar to FIG. 3, delaminations along the c-plane are observed. FIG. 6 is a crystal lattice image observed with a TEM in the vicinity of the center in the thickness direction corresponding to FIG. 5. In FIG. 6, although linearity of the linear lattice image corresponding to the c-plane of the graphite is slightly inferior to that in FIG. 4, extending of the lines can be confirmed.

COMPARATIVE EXAMPLE 2

In Comparative Example 2, polyimide films manufactured by DuPont and sold under the trade name of Kapton H with various thicknesses were graphitized by the same method as that in Example 5.

Although the production process of the Kapton film is not known, it is assumed that the Kapton film is produced by a method in which an imidization catalyst composed of acetic anhydride, beta-picoline, and DMAc is added to a polyamic acid solution prepared by dissolving 1 equivalent of 4,4'-

TABLE 6

| Heat treatment temperature (° C.) | Thickness of starting material (μm) | Properties of filmy graphite ||||||||
|---|---|---|---|---|---|---|---|---|---|
| | | Thickness (μm) | Density (g/cm$^3$) | Electrical conductivity (S·cm) | ρ(77K)/ρ(rt) | ρ(4K)/ρ(rt) | Thermal conductivity (W/m·K) | Thermal diffusivity (×10$^{-4}$ m$^2$/s) | Raman spectrum intensity ratio (1310 cm$^{-1}$/1580 cm$^{-1}$) |
| 2800 | 12.5 | 5.0 | 2.2 | 13500 | — | — | 1481 | 9.5 | — |
| | 25 | 10.3 | 2.19 | 13000 | 0.9 | 0.75 | 1398 | 9 | — |
| | 50 | 21 | 2.17 | 13000 | 1.0 | 0.9 | 1305 | 9 | — |
| | 75 | 33 | 2.14 | 12000 | 1.3 | 1.2 | 1500 | 9.9 | 0.38 |
| | 125 | 55 | 2.10 | 12000 | 1.45 | 1.4 | 1486 | 10 | 0.41 |
| 3000 | 12.5 | 4.9 | 2.42 | 20000 | — | — | 1767 | 10.3 | — |
| | 25 | 10.6 | 2.41 | 20000 | 0.8 | 0.4 | 1760 | 10.3 | — |
| | 50 | 20 | 2.38 | 16000 | 0.9 | 0.75 | 1725 | 10.2 | — |
| | 75 | 32.5 | 2.17 | 16000 | 1.1 | 1 | 1536 | 10 | 0.26 |
| | 125 | 55.5 | 2.12 | 13000 | 1.2 | 1 | 1505 | 10 | 0.3 | oxydianiline in dimethylacetamide (DMAc) and further dissolving 1 equivalent of pyromellitic dianhydride therein.

The Kapton H has an elastic modulus of 330 kgf/mm², a coefficient of water absorption of 2.9%, a birefringence of 0.11, and a coefficient of linear expansion of $2.7 \times 10^{-5}/°C$.

Various physical properties of the filmy graphites obtained in Comparative Example 2 are shown in Table 7. As is evident from comparison between Tables 7 and 6, the properties of the filmy graphites in Example 5 are remarkably superior to the filmy graphites produced from the Kapton films in Comparative Example 2.

TABLE 7

| Heat treatment temperature (°C.) | Thickness of starting material (μm) | Properties of filmy graphite | | | | | | | |
|---|---|---|---|---|---|---|---|---|---|
| | | Thickness (μm) | Density (g/cm³) | Electrical conductivity (S · cm) | $\rho(77K)/\rho(rt)$ | $\rho(4K)/\rho(rt)$ | Thermal conductivity (W/m · K) | Thermal diffusivity (×10⁻⁴ m²/s) | Raman spectrum intensity ratio (1310 cm⁻¹/1580 cm⁻¹) |
| 2800 | 25 | 10.3 | 2.27 | 11000 | 1.1 | 1 | 887 | 5.7 | — |
| | 50 | 23.5 | 2.13 | 6900 | 1.2 | 1.1 | 680 | 4.5 | — |
| | 75 | 41 | 1.89 | 3500 | 1.8 | 1.6 | 442 | 3.3 | 0.41 |
| | 125 | 100 | 1.42 | 980 | 2.5 | 2.8 | 238 | 2.3 | 0.44 |
| 3000 | 25 | 10.1 | 2.46 | 18000 | 1.05 | 0.8 | 1706 | 9.8 | — |
| | 50 | 21 | 2.38 | 12000 | 1.2 | 1.1 | 1519 | 9.0 | — |
| | 75 | 35 | 2.14 | 8000 | 1.7 | 1.5 | 1237 | 8.1 | 0.37 |
| | 125 | 70 | 1.86 | 2800 | 2.1 | 2.5 | 660 | 5 | 0.4 |

Figure 7:
FIG. 7 is a bright-field image of a filmy graphite in the vicinity of a surface layer in a comparative example, the image being observed with a TEM.
Figure 8:
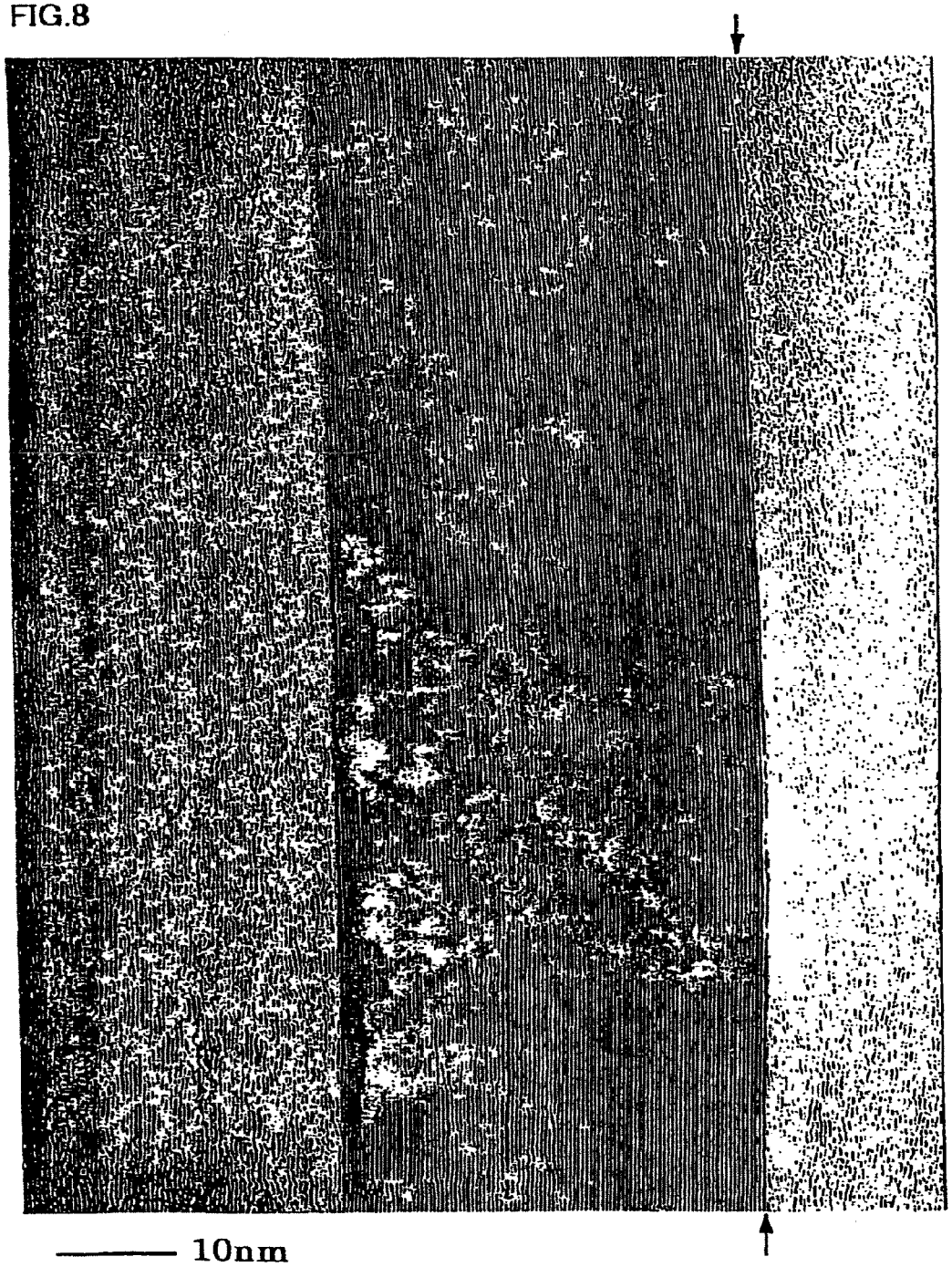
FIG. 8 is a lattice image of a filmy graphite in the vicinity of a surface layer in a comparative example, the image being observed with a TEM.

FIG. 7 is a bright-field image of a filmy graphite in the vicinity of a surface layer, the filmy graphite being obtained by heat treatment at 3,000° C. of the Kapton (registered trademark) film with a thickness of 125 μm in Comparative Example 2, the image being observed with a TEM. In FIG. 7, a single-crystal structure in which the c-plane of the graphite is parallel to the surface occurs in the vicinity of the surface layer. FIG. 8 is a crystal lattice image observed with a TEM in the vicinity of the surface layer corresponding to FIG. 7. In FIG. 8, although linearity of the linear lattice image corresponding to the c-plane of the graphite is slightly inferior to that in FIG. 4, extending of the lines can be confirmed.

Figure 9:
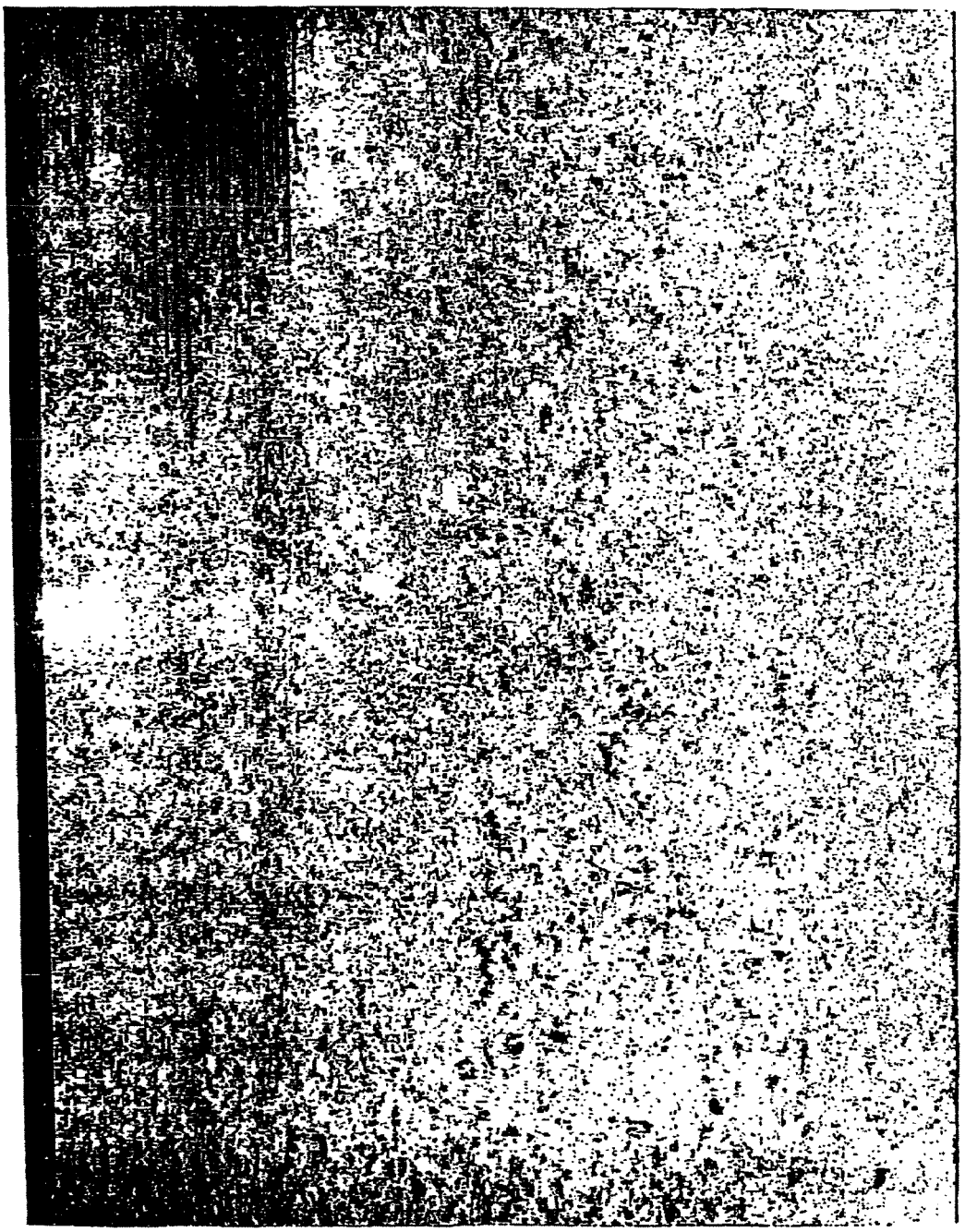
FIG. 9 is a bright-field image of a filmy graphite in the vicinity of a center in the thickness direction in a comparative example, the image being observed with a TEM.
Figure 10:
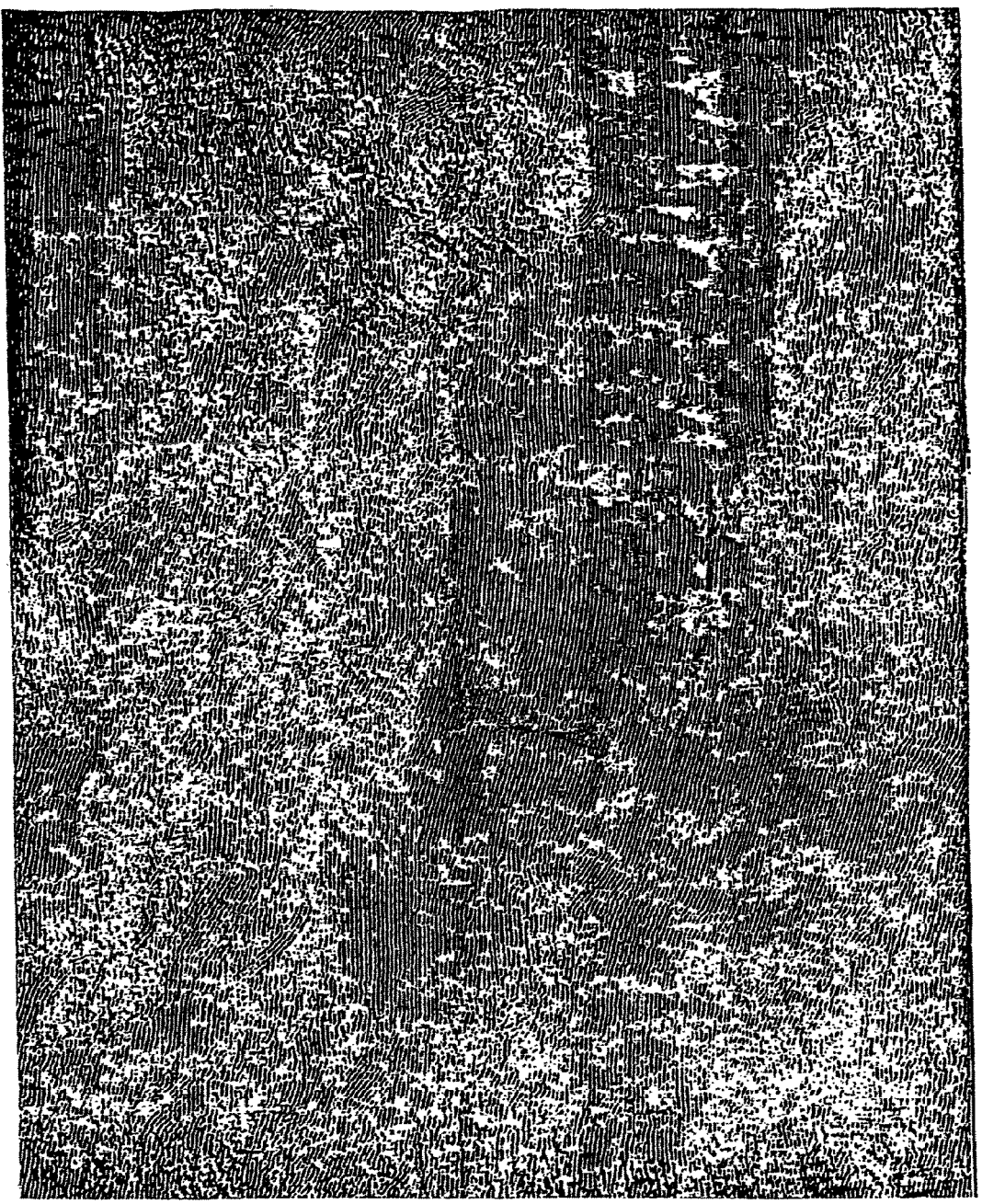
FIG. 10 is a lattice image of a filmy graphite in the vicinity of a center in the thickness direction in a comparative example, the image being observed with a TEM.

FIG. 9 is a bright-field image of a filmy graphite in the vicinity of a center in the thickness direction, the image being observed with a TEM. In the TEM photograph, a layered structure is not formed in the vicinity of the center in the thickness direction unlike the surface layer, and thus it is evident that graphitization is insufficient. FIG. 10 is a crystal lattice image observed with a TEM in the vicinity of a center in the thickness direction corresponding to FIG. 9. In FIG. 10, it can be confirmed that the linear lattice image corresponding to the c-plane of the graphite is wavy and broken. This indicates that even if graphitization partially proceeds, the resulting graphite is in a microcrystalline state or the c-plane orientation is not aligned. That is, with respect to the filmy graphite produced from the Kapton (registered trademark) film, even if heat treatment is performed at a high temperature of 3,000° C., graphitization does not sufficiently proceed in the center in the thickness direction.

INDUSTRIAL APPLICABILITY

According to the present invention, in comparison with the conventional polymer graphitization process, it is possible to produce a thicker filmy graphite, and graphitization is enabled at lower temperatures and in a shorter time when a polymer film with the same thickness is graphitized.

The invention claimed is:

1. A method for producing a filmy graphite comprising the step of heat-treating a polyimide film having a thickness of 12.5 μm or more and 25 μm or less, wherein the filmy graphite has a thermal conductivity of 1,767 W/m·K or more, wherein the filmy graphite has an electrical conductivity of 20,000 S/cm or more.

2. A method for producing a filmy graphite comprising the step of heat-treating a polyimide film, wherein the filmy graphite has a thickness of 4.9 μm or more and 10.6 μm or less, and has a thermal conductivity of 1,767 W/m·K or more.

3. The method according to claim 2, wherein the filmy graphite has an electrical conductivity of 20,000 S/cm or more.

4. A method for producing a filmy graphite comprising the step of heat-treating a polyimide film having a thickness of 12.5 μm or more and 25 μm or less, wherein the filmy graphite has a thermal conductivity of 1,481 W/m·K or more, wherein the filmy graphite has an electrical conductivity of 13,500 S/cm or more.

5. A method for producing a filmy graphite comprising the step of heat-treating a polyimide film, wherein the filmy graphite has a thickness of 5.0 μm or more and 10.3 μm or less, and has a thermal conductivity of 1,481 W/m·K or more.

6. The method according to claim 5, wherein the filmy graphite has an electrical conductivity of 13,500 S/cm or more.

7. A method for producing a filmy graphite comprising the step of heat-treating a polyimide film having a thickness of 25 μm or more and 50 μm or less, wherein the filmy graphite has a thermal conductivity of 1,760 W/m·K or more, wherein the filmy graphite has an electrical conductivity of 20,000 S/cm or more.

8. A method for producing a filmy graphite comprising the step of heat-treating a polyimide film, wherein the filmy graphite has a thickness of 10.6 μm or more and 20 μm or less, and has a thermal conductivity of 1,760 W/m·K or more, wherein the filmy graphite has an electrical conductivity of 20,000 S/cm or more.

9. A method for producing a filmy graphite comprising the step of heat-treating a polyimide film having a thickness of 25 μm or more and 50 μm or less, wherein the filmy graphite has a thermal conductivity of 1,398 W/m·K or more, wherein the filmy graphite has an electrical conductivity of 13,000 S/cm or more.

10. A method for producing a filmy graphite comprising the step of heat-treating a polyimide film, wherein the filmy graphite has a thickness of 10.3 μm or more and 21 μm or less, and has a thermal conductivity of 1,398 W/m·K or more, wherein the filmy graphite has an electrical conductivity of 13,000 S/cm or more.

11. A method for producing a filmy graphite comprising the step of heat-treating a polyimide film having a thickness of 50 μm or more and 75 μm or less, wherein the filmy graphite has a thermal conductivity of 1,725 W/m·K or more,
wherein the filmy graphite has an electrical conductivity of 16,000 S/cm or more.

12. A method for producing a filmy graphite comprising the step of heat-treating a polyimide film, wherein the filmy graphite has a thickness of 20 μm or more and 32.5 μm or less, and has a thermal conductivity of 1,725 W/m·K or more,
wherein the filmy graphite has an electrical conductivity of 16,000 S/cm or more.

13. A method for producing a filmy graphite comprising the step of heat-treating a polyimide film having a thickness of 50 μm or more and 75 μm or less, wherein the filmy graphite has a thermal conductivity of 1,500 W/m·K or more,
wherein the filmy graphite has an electrical conductivity of 13,000 S/cm or more.

14. A method for producing a filmy graphite comprising the step of heat-treating a polyimide film, wherein the filmy graphite has a thickness of 21 μm or more and 33 μm or less, and has a thermal conductivity of 1,500 W/m·K or more,
wherein the filmy graphite has an electrical conductivity of 13,000 S/cm or more.

15. A method for producing a filmy graphite comprising the step of heat-treating a polyimide film having a thickness of 75 μm or more and 125 μm or less, wherein the filmy graphite has a thermal conductivity of 1,536 W/m·K or more,
wherein the filmy graphite has an electrical conductivity of 16,000 s/cm or more.

16. A method for producing a filmy graphite comprising the step of heat-treating a polyimide film, wherein the filmy graphite has a thickness of 32.5 μm or more and 55.5 μm or less, and has a thermal conductivity of 1,536 W/m·K or more,
wherein the filmy graphite has an electrical conductivity of 16,000 S/cm or more.

17. A method for producing a filmy graphite comprising the step of heat-treating a polyimide film having a thickness of 75 μm or more and 125 μm or less, wherein the filmy graphite has a thermal conductivity of 1,500 W/m·K or more,
wherein the filmy graphite has an electrical conductivity of 12,000 S/cm or more.

18. A method for producing a filmy graphite comprising the step of heat-treating a polyimide film, wherein the filmy graphite has a thickness of 33 μm or more and 55 μm or less, and has a thermal conductivity of 1,500 W/m·K or more,
wherein the filmy graphite has an electrical conductivity of 12,000 S/cm or more.

19. A method for producing a filmy graphite comprising the step of heat-treating a polyimide film having a thickness of 12.5 μm or more and 125 μm or less, wherein the filmy graphite has a thermal conductivity of 1,305 W/m·K or more,
wherein the filmy graphite has an electrical conductivity of 12,000 S/cm or more.

20. A method for producing a filmy graphite comprising the step of heat-treating a polyimide film having a thickness of 12.5 μm or more and 125 μm or less, wherein the filmy graphite has a thermal conductivity of 1,725 W/m·K or more,
wherein the filmy graphite has an electrical conductivity of 13,000 S/cm or more.

* * * * *